US008688163B2

(12) United States Patent
Chen et al.

(10) Patent No.: US 8,688,163 B2
(45) Date of Patent: Apr. 1, 2014

(54) INTERACTION BETWEEN ACCUMULATIVE POWER CONTROL AND MINIMUM/MAXIMUM TRANSMIT POWER IN LTE SYSTEMS

(75) Inventors: Wanshi Chen, San Diego, CA (US); Peter Gaal, San Diego, CA (US); Juan Montojo, San Diego, CA (US); Taesang Yoo, San Diego, CA (US); Xiliang Luo, Northridge, CA (US); Tao Luo, San Diego, CA (US); Yongbin Wei, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 12/976,499

(22) Filed: Dec. 22, 2010

(65) Prior Publication Data

US 2011/0159914 A1    Jun. 30, 2011

Related U.S. Application Data

(60) Provisional application No. 61/291,332, filed on Dec. 30, 2009, provisional application No. 61/302,031, filed on Feb. 5, 2010.

(51) Int. Cl.
*H04B 7/00*    (2006.01)
(52) U.S. Cl.
USPC ............. 455/522; 455/69; 455/507; 455/500; 455/517; 455/515; 370/310; 370/328; 370/338; 370/329; 370/343
(58) Field of Classification Search
USPC .......... 455/522, 69, 68, 500, 517, 67.11, 504, 455/507, 514, 515, 550.1, 422.1, 403, 455/426.1, 426.2, 445; 370/310, 328, 338, 370/329, 343
See application file for complete search history.

(56) References Cited

U.S. PATENT DOCUMENTS

| | | | |
|---|---|---|---|
| 2003/0036403 A1 | 2/2003 | Shiu et al. | |
| 2005/0213636 A1* | 9/2005 | Zeira et al. | 375/130 |

(Continued)

FOREIGN PATENT DOCUMENTS

| | | |
|---|---|---|
| EP | 0682417 A2 | 11/1995 |
| EP | 1478104 A1 | 11/2004 |

(Continued)

OTHER PUBLICATIONS

Ericsson et al., "Uplink Power Control for Carrier Aggregation", 3GPP Draft; R1-094274 ULPC for Carrier Aggregation, 3RD Generation Partnership Project (3GPP), Mobile Competence Centre; 650, Route Des Lucioles; F-06921 Sophia-Antipolis Cede; France, no. Miyazaki; Oct. 12, 2009, Oct. 16, 2009, XP050388737, [retrieved on Oct. 5, 2009].

(Continued)

*Primary Examiner* — Keith Ferguson
(74) *Attorney, Agent, or Firm* — Anthony R. Morris

(57) ABSTRACT

Methods and apparatus in a wireless communication system are described for receiving and processing transmit power control commands, where, for example, the response to the transmit power control commands is conditionally decoupled from at least one of a transmit bandwidth parameter, a transport format parameter and a power stepsize limit. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

26 Claims, 15 Drawing Sheets

(56) References Cited

U.S. PATENT DOCUMENTS

| | | |
|---|---|---|
| 2005/0249154 A1 | 11/2005 | Kim et al. |
| 2006/0019694 A1 | 1/2006 | Sutivong et al. |
| 2008/0175306 A1* | 7/2008 | Matsuoka et al. ............ 375/146 |
| 2010/0056169 A1* | 3/2010 | Koo et al. ..................... 455/450 |
| 2010/0091724 A1* | 4/2010 | Ishii et al. ..................... 370/329 |
| 2011/0111790 A1* | 5/2011 | Andersson et al. ........... 455/522 |

FOREIGN PATENT DOCUMENTS

| | | |
|---|---|---|
| JP | 2009273167 A | 11/2009 |
| KR | 20090113342 A | 10/2009 |
| TW | 200605535 | 2/2006 |
| TW | 201312961 A | 3/2013 |
| WO | WO9859432 A2 | 12/1998 |
| WO | WO2005114866 A1 | 12/2005 |
| WO | WO2006112764 A1 | 10/2006 |
| WO | WO2008115774 A1 | 9/2008 |

OTHER PUBLICATIONS

International Search Report and Written Opinion—PCT/US2010/062012, ISA/EPO—Jun. 20, 2011.
LTE; Evolved Universal Terrestrial Radio Access (E-UTRA); Physical layer procedures (3GPP TS 36.213 version 8.7.0 Release 8), Technical Specification, European Telecommunications Standards Institute (ETSI), 650, Route Des Lucioles; F-06921 Sophia-Antipolis; France, no. V8.7.0, Jun. 1, 2009, XP014044750.
Taiwan Search Report—TW099146158—TIPO—Aug. 5, 2013.

\* cited by examiner

INTERACTION BETWEEN ACCUMULATIVE POWER CONTROL AND MINIMUM/MAXIMUM TRANSMIT POWER IN LTE SYSTEMS

The present application claims priority to U.S. Provisional Patent Application Ser. No. 61/291,332 entitled "Interaction Between Accumulative Power Control and Maximum/Minimum Transmit Power in Long Term Evolution Systems," filed Dec. 30, 2009, the entirety of which is hereby incorporated by reference. The present application also claims priority to U.S. Provisional Patent Application Ser. No. 61/302,031, entitled "Uplink Power Design With Respect to Maximum and Minimum Power Saturation in LTE-Advanced," filed Feb. 5, 2010, the entirety of which is hereby incorporated by reference.

FIELD OF INVENTION

The present invention relates generally to the field of wireless communications and, in particular, to systems and methods for controlling uplink transmit power.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division-multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

In LTE Rel-8, power control of the physical uplink shared channel (PUSCH) is managed by a closed-loop accumulative power control (APC) algorithm that, in response to channel conditions, increments or decrements transmit power in discrete step sizes, whereupon the respective increments or decrements are disabled if the power reaches a configured maximum or minimum power level. The computation of the transmit power is based on the scheduled PUSCH transmission. However, depending on the scheduled PUSCH transmission, this algorithm can result in over-power or under-power conditions when the bandwidth and/or the modulation/coding scheme of the uplink channel is increased or decreased in response to changing resource grants.

SUMMARY

The disclosed embodiments relate to systems, methods, apparatus and computer program products for implementing power control in a wireless communication system.

Disclosed embodiments include methods, apparatus and articles of manufacture for receiving a transmit power control command, determining a commanded transmit power level based on the transmit power control command and adjusting a transmit power level based on the commanded transmit power level, where the transmit power level is decoupled from at least one of a transmit bandwidth parameter, a transport format parameter and a power stepsize limit.

Other disclosed embodiments include methods, apparatus and articles of manufacture for receiving a path loss estimate from a mobile device and transmitting a transmit power control command to the mobile device, where the transmit power control command is decoupled from at least one of a transmit bandwidth parameter, a transport format parameter and a power stepsize limit, and wherein the transmit power control command is configured to adjust a transmit power level of the mobile device.

Yet other disclosed embodiments include methods, apparatus and articles of manufacture for maintaining a number of uplink transmit power control loops corresponding to a number of reference bandwidths or a number of modulation and coding schemes (MCSs), updating each of the uplink transmit power control loops with a transmit power control (TPC) command received in a downlink control channel, and selecting one of the uplink transmit power control loops to control uplink transmit power, based on at least one of a bandwidth assignment in the downlink control channel and an MCS assignment in the downlink control channel.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
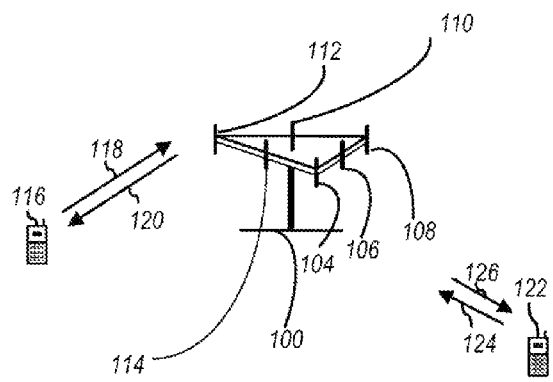
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106; another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124, and 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCFI), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:
    3G 3rd Generation
    3GPP 3rd Generation Partnership Project
    ACLR Adjacent channel leakage ratio
    ACPR Adjacent channel power ratio
    ACS Adjacent channel selectivity
    ADS Advanced Design System
    AMC Adaptive modulation and coding
    A-MPR Additional maximum power reduction
    ARQ Automatic repeat request
    BCCH Broadcast control channel
    BTS Base transceiver station
    CCE Channel Control Element
    CDD Cyclic delay diversity
    CCDF Complementary cumulative distribution function
    CDMA Code division multiple access
    CFI Control format indicator
    Co-MIMO Cooperative MIMO
    CP Cyclic prefix
    CPICH Common pilot channel
    CPRI Common public radio interface
    CQI Channel quality indicator
    CRC Cyclic redundancy check
    DCI Downlink control indicator
    DFT Discrete Fourier transform
    DFT-SOFDM Discrete Fourier transform spread OFDM
    DL Downlink (base station to subscriber transmission)
    DL-SCH Downlink shared channel
    DSP Digital signal processing
    DT Development toolset
    DVSA Digital vector signal analysis
    EDA Electronic design automation
    E-DCH Enhanced dedicated channel
    E-UTRAN Evolved UMTS terrestrial radio access network
    eMBMS Evolved multimedia broadcast multicast service
    eNB Evolved Node B EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MCS Modulation and Coding Scheme
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUCCH Physical uplink shared channel
RB Resource Block
RBG Resource Block Group
RE Resource Element
REG Resource Element Group
RNTI Radio Network Temporary Identifier.

Figure 2:
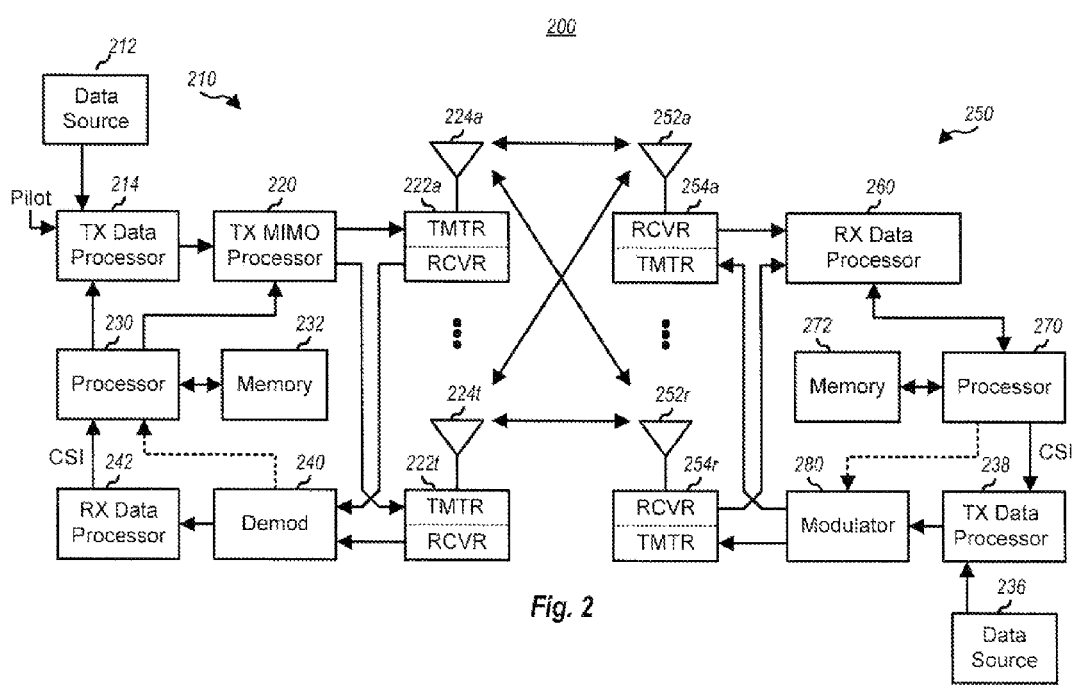
FIG. 2 illustrates a block diagram of a wireless communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MEMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink (not shown).

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise ratio (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink (not shown).

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

As noted above, uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells. Uplink power control in LTE Rel-8 is specified in §5.1 et seq. of 3GPP Technical Specification TS 36.213, "Physical Layer Procedures (Release 8)," which is incorporated herein by reference.

In LTE Rel-8, the principle mechanisms for varying the uplink data rate are the transmit bandwidth (determined by the number of scheduled resource blocks in a subframe) and the modulation and coding scheme (MCS) that determines the number of bits per resource element (BPRE). In LTE Rel-8, uplink closed-loop power control is used to control the transmit power per resource block of the physical uplink control channel (PUCCH) and the physical uplink shared channel (PUSCH), and the power of sounding reference signals (SRSs) within the PUSCH that are used to estimate channel quality at different frequencies. The PUSCH uses both absolute and accumulative power control modes, while the PUCCH uses only accumulative power control. The sounding reference signals are typically configured to have a fixed offset relative to the PUSCH transmit power level, but are otherwise controlled in the same manner as the PUSCH.

LTE Rel-8 specifies power control formulas for the PUCCH, the PUSCH and for the SRS (which are transmitted on the uplink to enable the network to estimate uplink channel quality at different frequencies). However, unlike the PUCCH (which does not have resources assigned by the PDCCH), the bandwidth of the PUSCH (and the SRSs that are linked to the PUSCH) can vary significantly from subframe to subframe as a function of changing resource assignments received on the physical downlink control channel (PDCCH). The PUSCH transmit power in a given subframe (i) is given by $$P_{PUSCH}(i) = \min\{P_{CMAX}, 10\log_{10}(M_{PUSCH}(i)) + P_{o\_PUSCH}(j) + \alpha(j) \cdot PL + \Delta_{TF}(i) + f(i)\} \quad (1)$$

where $P_{CMAX}$ is a configurable maximum total transmit power of the UE; $M_{PUSCH}(i)$ is a bandwidth factor based on the number of allocated resource blocks in subframe (I); $P_{o\_PUSCH}(j)$ is the sum of a cell-specific nominal component provided from higher layers and a UE-specific component provided by higher layers; and (j) is a parameter indicating a semi-persistent, a dynamically scheduled resource grant or a PUSCH (re)transmission corresponding to the random access response grant, which can be ignored for the present discussion. PL is a downlink path-loss estimate calculated in the UE and $\alpha(j)$ is a scaling factor provided from higher layers. The transport format parameter $\Delta_{TF}(i)$ is dependent on the modulation and coding scheme (see 3GPP TS 36.213 §5.1.1.1 for a description of the components of $\Delta_{TF}(i)$, the details of which may be omitted for the present discussion). The parameter f(i) is the accumulative power control (APC) command, where $$f(i) = f(i-1) + \delta_{PUSCH}(-K_{PUSCH}),$$

and where $\delta_{PUSCH}$ is a UE specific correction value, also referred to as a TPC (transmit power control) command that is included in the PDCCH with DCI format 0 for a specific UE, or with DCI formats 3 and 3A for multiple UEs. $K_{PUSCH}$ is a timing offset factor associated with the PDCCH and the adjustment of the transmit power. TPC power control step sizes are limited by the LTE Rel-8 specification, e.g., to discrete values of −1 dB, 0 dB, +1 dB and +3 dB.

There is also a configurable minimum total transmit power in LTE Rel-8, which implies a second power control equation:

$$P_{PUSCH}(i) = \max\{P_{CMIN}, 10\log_{10}(M_{PUSCH}(i)) + P_{o\_PUSCH}(j) + \alpha(j) \cdot PL + \Delta_{TF}(i) + f(i)\} \quad (2)$$

where $P_{CMIN}$ is the minimum total transmit power. In LTE Rel-8, if the UE reaches the maximum power, then subsequent positive TPC commands are not accumulated. Conversely, if the UE reaches the minimum power, then subsequent negative TPC commands are not accumulated.

Under a current understanding in 3GPP RAN1 (Radio Access Network Group 1), the formulation of power control described above is proposed for LTE Advanced when uplink resources are assigned via DCI format 0 (or other DCI formats scheduling uplink data transmissions) in the PDCCH. However, in the case of no uplink assignments (uplink power control via DCI formats 3/3A), the current understanding is that the maximum and minimum power thresholds should be ignored, allowing unlimited f(i) accumulation. The rationale for this approach (with respect to DCI formats 3/3A) is that a comparison of the commanded UE transmit power with the maximum or the minimum power thresholds is not possible, since there is no associated PUSCH transmissions.

Under this current proposal, for uplink resource assignments configured by DCI format 0, the actual transmit power of the UE depends not only on the adjustments to the APC term f(i), but also on changes to the modulation and coding scheme (MCS) represented by the value of $\Delta_{TF}(i)$ and to the assigned bandwidth represented by $M_{PUSCH}(i)$ (number of allocated resource blocks). With respect to changes in bandwidth allocations, this approach creates a high likelihood of exceeding the maximum power threshold ($P_{CMAX}$) when the allocated bandwidth increases and falling below the minimum power threshold ($P_{CMIN}$) when the allocated bandwidth decreases.

By way of example, assume a 4:1 bandwidth increase between subframes when the current transmit power level is close to the maximum power level. For a given power per resource block, the required power increase will be 10 log BW2/BW1=10 log 4=6 dB, independent of any changes in TPC and MCS. Conversely, assume a 4:1 bandwidth decrease between subframes when the current transmit power level is close to the minimum power level. For a given power per resource block, the required power decrease will be 10 log BW2/BW1=10 log 0.25=−6 dB, independent of any changes in TPC and MCS. In either case, under the current paradigm, the total transmit power of the UE could be limited to the maximum power level or the minimum power level for the number of subframes required to readjust the power level under the power control stepsize limitations in the current LTE Rel-8 specification.

Figure 3:
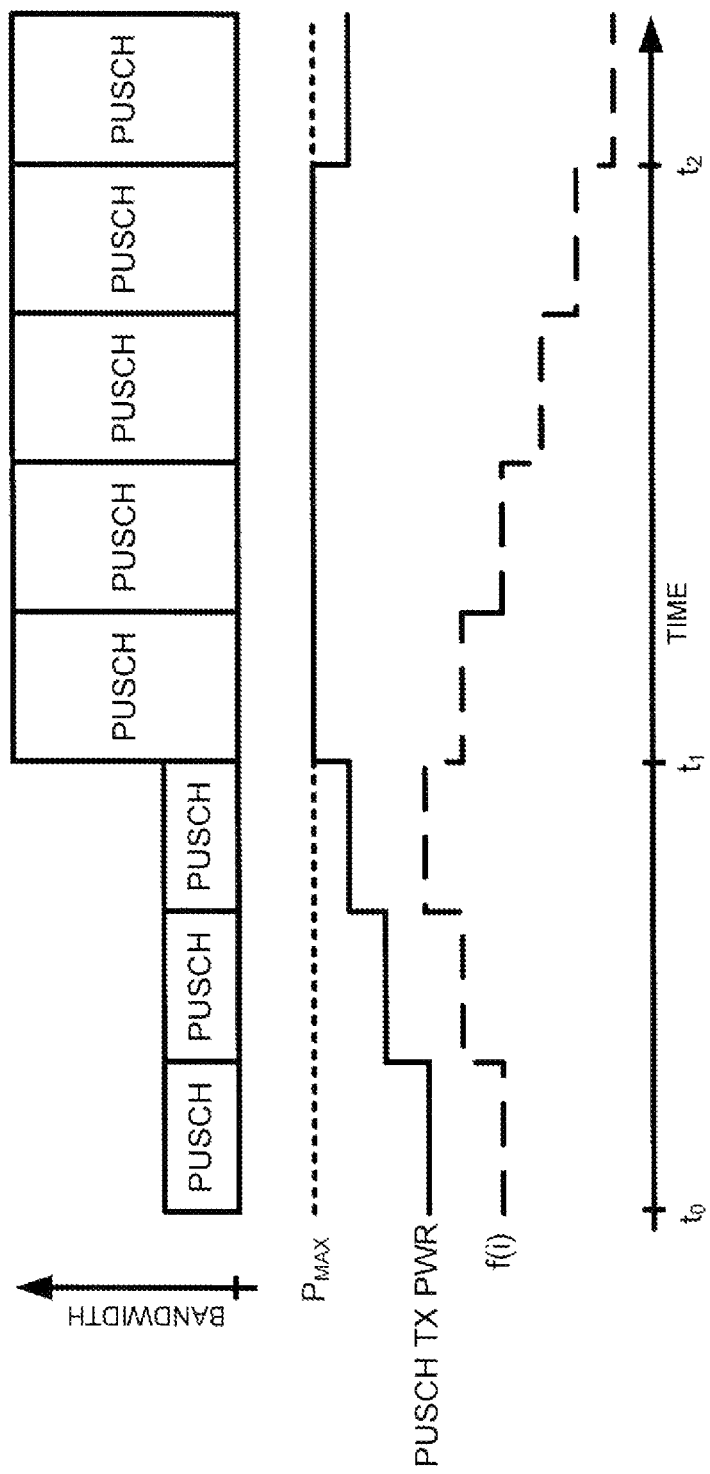
FIG. 3 illustrates a conventional power control method.

FIG. 3 illustrates an exemplary case where, for example, a narrow bandwidth allocation of the PUSCH is increased to a wide bandwidth allocation at time $t_1$ due to, for example, improved channel conditions. If the PUSCH transmit power level is already close to the maximum power level, due to a sequence of power up commands, then the bandwidth increase may cause the commanded power level to exceed the maximum power level and push the UE into nonlinear operation or power saturation (assuming the maximum power threshold ($P_{MAX}$) is based on a linear operation limit rather than an absolute power limit). As a result, the PUSCH transmit power of the UE will be greater than or equal to the maximum power threshold ($P_{MAX}$) for one or more subframes while successive power down commands are issued by the eNodeB on the PDCCH. During this interval ($t_1$ to $t_2$), the UE may be operating in saturation or in a nonlinear mode, which can result in data errors and excessive power consumption.

Figure 4:
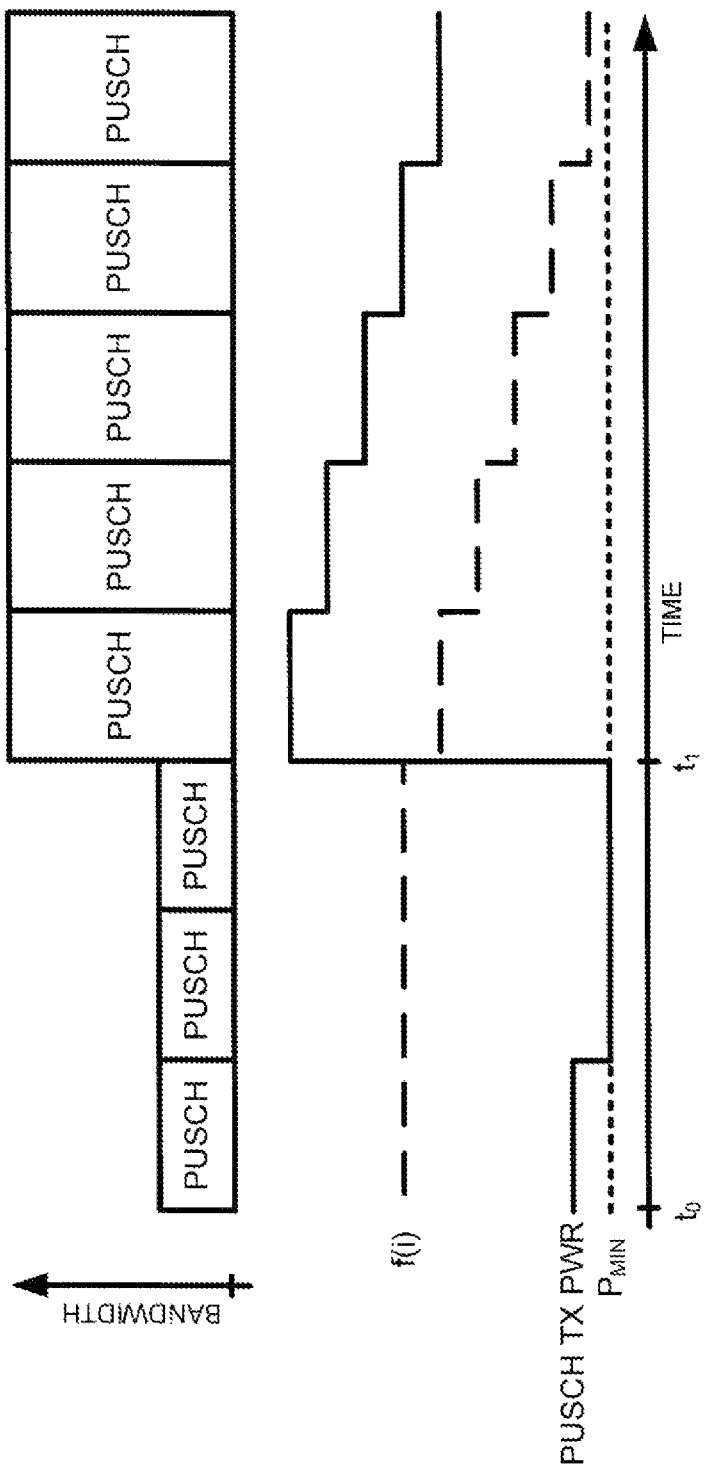
FIG. 4 illustrates a conventional power control method.

FIG. 4 illustrates an exemplary case where, for example, at a narrow bandwidth allocation where the power level of the PUSCH has reached the minimum power threshold ($P_{MIN}$) and has stopped responding to power down commands even though f(i) is still at a relatively high level. When the allocated bandwidth is increased at time $t_1$ (e.g., for improved channel conditions), the commanded power level, at a given power per resource block, will increase and may push the UE well over the minimum power threshold as described above. As a result, the PUSCH transmit power of the UE will be greater than necessary for the channel conditions for one or more subframes while successive power down commands are issued by the eNodeB on the PDCCH. During this interval, the UE may be consuming unnecessary power and causing interference to other users.

Figure 5:
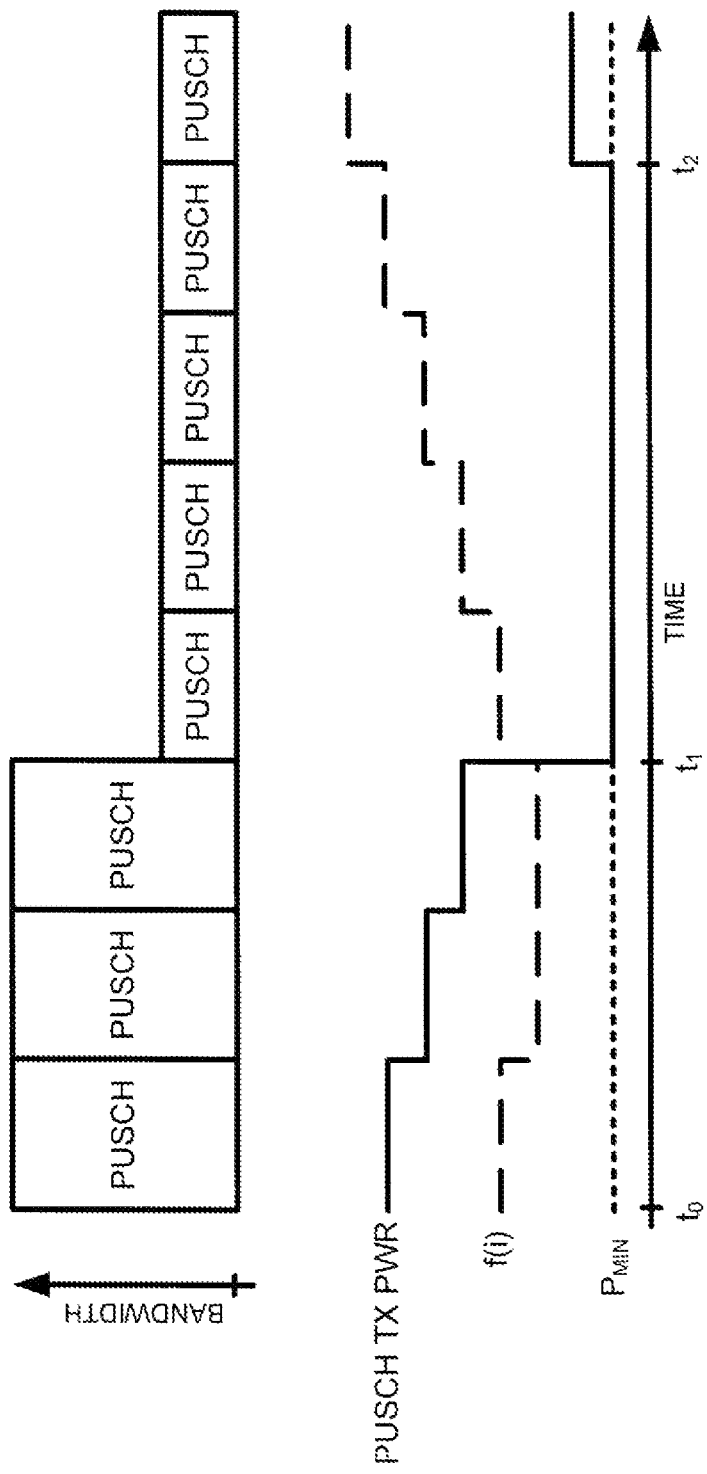
FIG. 5 illustrates a conventional power control method.

FIG. 5 illustrates an exemplary case where, for example, at a wide bandwidth allocation where the PUSCH transmit power is at a relatively-low level as a result decreases in f(i), a subsequent decrease in allocated bandwidth at $t_1$ (e.g., due to data rate requirements or channel quality changes) results in a PUSCH transmit power below or equal to the minimum power threshold ($P_{MIN}$). In this case, it may require several f(i) power up commands (from $t_1$ to $t_2$) to raise the transmit power above the minimum power threshold ($P_{MIN}$). During this time, the uplink transmission quality may suffer due to the combined effects of noise and interference.

Figure 6:
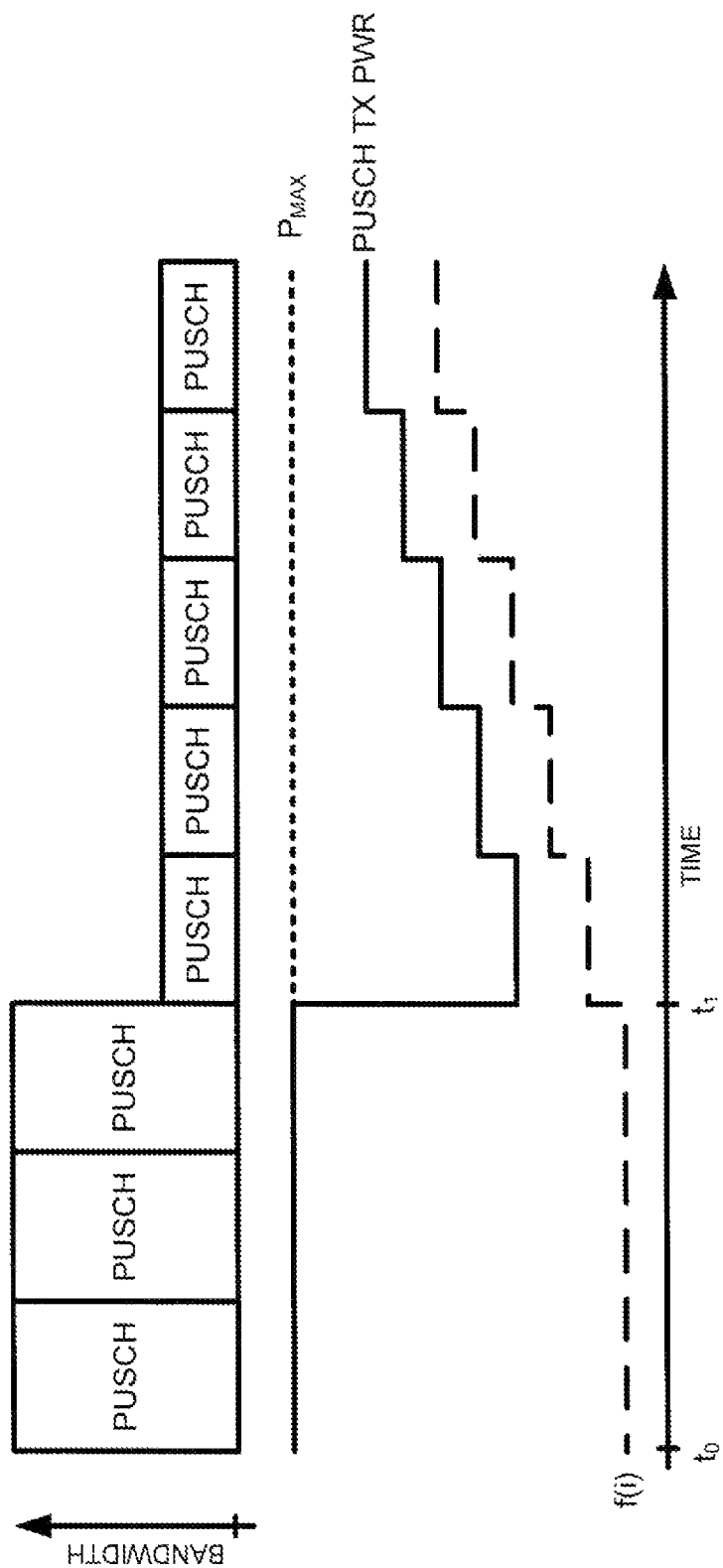
FIG. 6 illustrates a conventional power control method.

FIG. 6 illustrates an exemplary case where, for example, the PUSCH transmit power is at or above the maximum power threshold ($P_{MAX}$) at a relatively wide bandwidth, while f(i) is at a relatively low level. When the bandwidth allocation decreases at $t_1$, it may take several subframes of limited f(i) steps to bring the transmit power to the required level.

Figure 7:
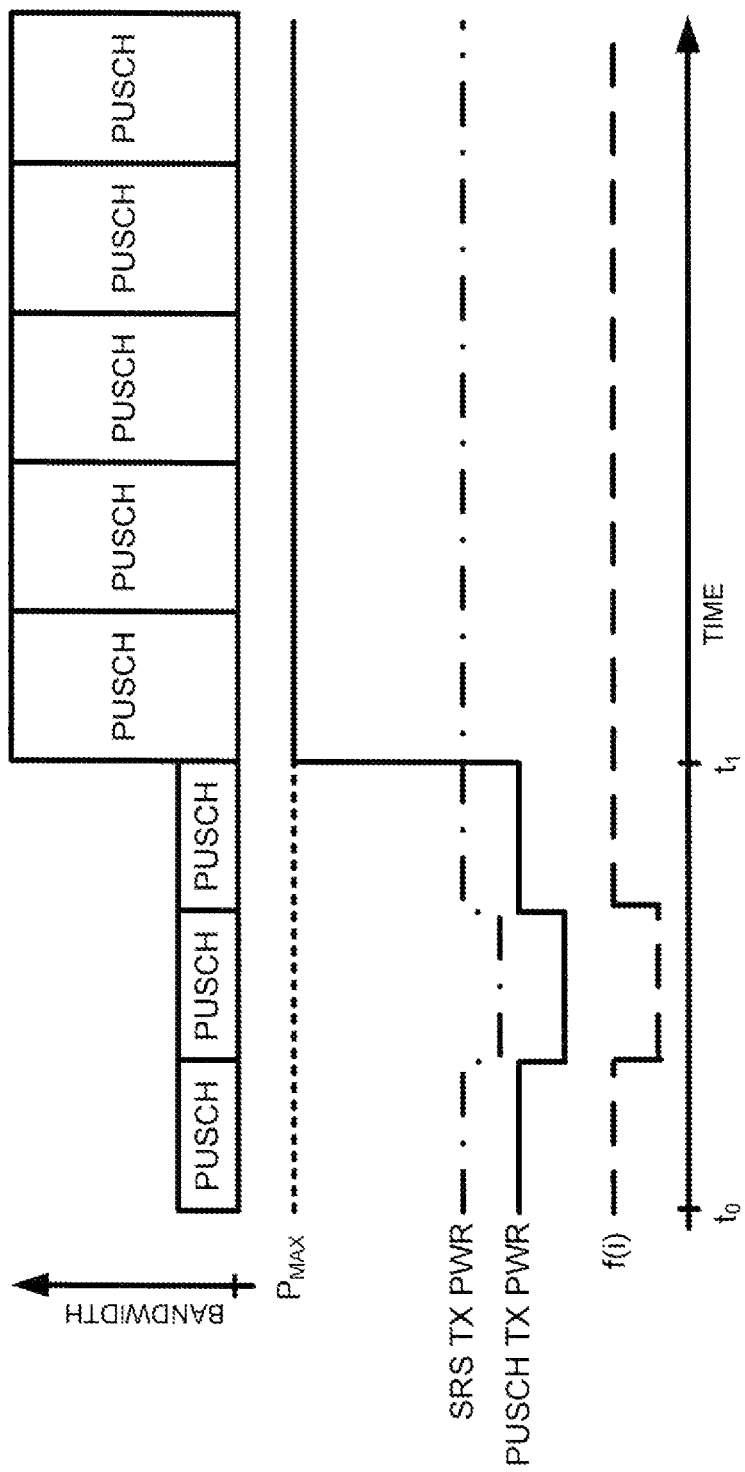
FIG. 7 illustrates a conventional power control method.

FIG. 7 illustrates an exemplary case where, initially, the SRS transmit power level tracks the PUSCH transmit power level with a fixed offset from subframe to subframe while f(i) is varied. However, when the allocated bandwidth increases at time $t_1$, increasing the PUSCH transmit power to or over the maximum power threshold ($P_{MAX}$), APC is disabled (f(i) does not increment) and the SRS transmit power level remains flat with an unknown and undesirably low level relative to the PUSCH transmit power level.

Figure 8:
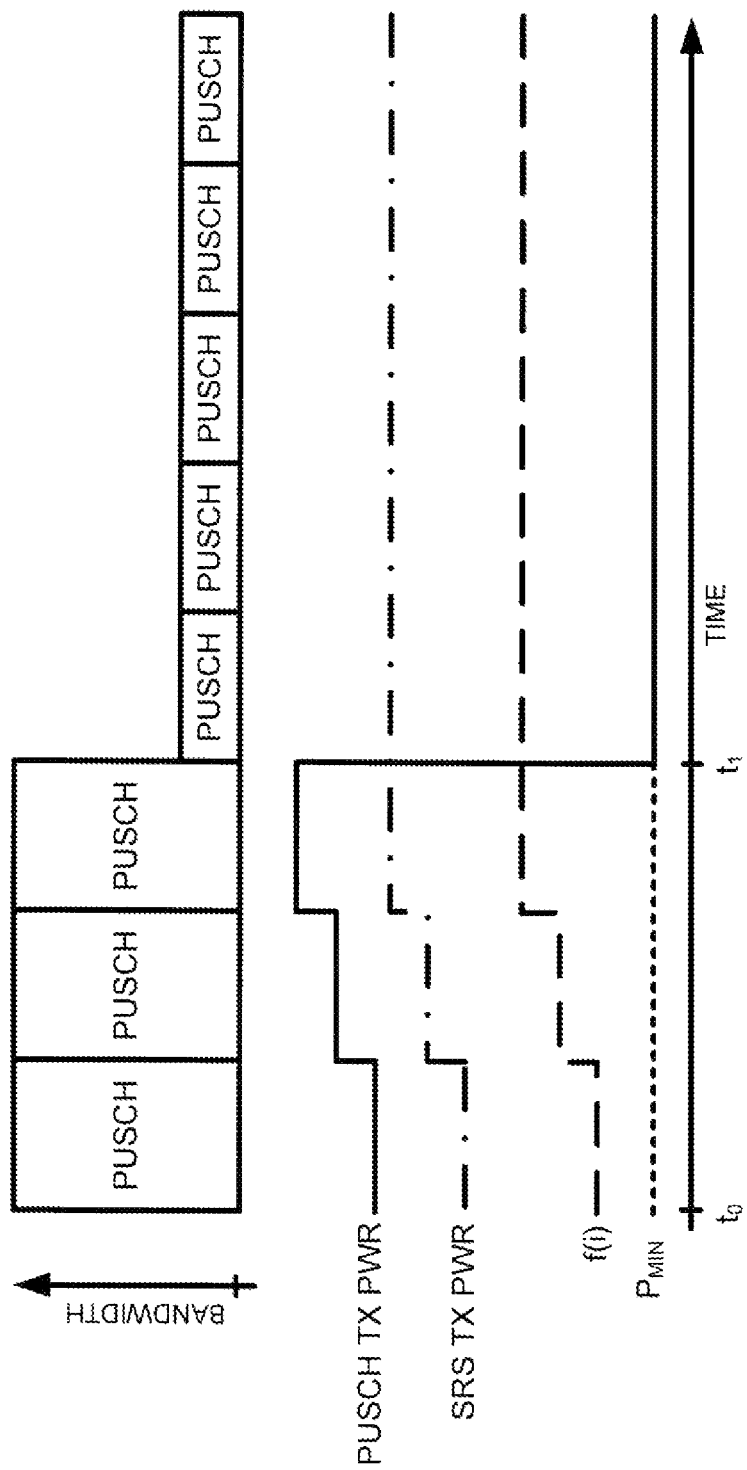
FIG. 8 illustrates a conventional power control method.

FIG. 8 illustrates an exemplary case where, initially, the SRS transmit power level tracks the PUSCH transmit power level with a fixed offset from subframe to subframe while f(i) is varied. However, when the allocated bandwidth decreases at time $t_1$, decreasing the PUSCH transmit power to or below the minimum power threshold ($P_{MIN}$), APC is disabled (f(i) does not decrement) and the SRS transmit power level remains flat with an unknown and undesirably high level relative to the PUSCH transmit power level.

In one embodiment, a solution to the problems described above is to decouple the power calculation algorithm from dynamic changes in PUSCH bandwidth (number of allocated RBs) as reflected in the parameter $M_{PUSCH}(i)$ and/or the modulation and coding scheme (MCS) as reflected in the parameter $\Delta_{TF}(i)$, or to make the APC adjustments independent of the maximum and minimum power thresholds.

For example, decoupling may be accomplished by replacing the dynamic MCS parameter $\Delta_{TF}(i)$ with a fixed or semi-persistent MCS parameter $\Delta_{TF}$ (i.e., no MCS adjustments), and/or replacing the dynamic PUSCH bandwidth parameter $M_{PUSCH}(i)$ with a fixed or semi-persistent bandwidth parameter $M_{PUSCH}$. The parameter $M_{PUSCH}$ may have a value $M_{PUSCH\_MAX}$ representing a fixed or semi-persistent number of RBs, such as 1 RB, for maximum power threshold calculations. The parameter $M_{PUSCH}$ may have a value $M_{PUSCH\_MIN}$ representing a fixed or semi-persistent number of RBs, such as 110 RBs (corresponding to a maximum system bandwidth) for minimum power threshold calculations. The formula for maximum power comparison can then be expressed as:

$$P_{PUSCH}(i)=\min\{P_{CMAX}, 10\log_{10}(M_{PUSCH\_MIN})+P_{o\_PUSCH}(j)+\alpha(j)\cdot PL+\Delta_{TF}+f(i)\} \quad (3)$$

Similarly, the formula for minimum power comparison can be expressed as:

$$P_{PUSCH}(i)=\max\{P_{CMIN}, 10\log_{10}(M_{PUSCH\_MAX})+P_{o\_PUSCH}(j)+\alpha(j)\cdot PL+\Delta_{TF}+f(i)\} \quad (4)$$

where $M_{PUSCH\_MIN}$, $M_{PUSCH\_MAX}$ and $\Delta_{TF}$ are configured by a higher layer (e.g., a layer above the physical layer, such as layer 3), assigned by the eNodeB on a semi-persistent scheduling basis or hard-coded in a specification, and are independent of the subframe index (i).

In one or more alternative embodiments, the dynamic values for PUSCH bandwidth and MCS may be used when the commanded transmit power level is between the maximum and minimum power thresholds, and the fixed or semi-persistent values of the PUSCH bandwidth and/or MCS (described above) may be used when the commanded transmit power is at or above the maximum power threshold or at or below the minimum power threshold.

In other embodiments, the dynamic values for PUSCH bandwidth and MCS may be used when the commanded transmit power is between the maximum and minimum power thresholds. However, instead of replacing the dynamic values with fixed or semi-persistent values when the commanded transmit power is at or above the maximum power threshold or at or below the minimum power threshold, the transmit power may be set to a predetermined offset from the maximum or minimum power threshold. For example, if the value of the commanded transmit power level is less than or equal to the value of the minimum transmit power threshold, the transmit power may be set to a fixed offset (e.g., 3 dB) above the minimum transmit power threshold. If the value of the commanded transmit power level is greater than or equal to the value of the maximum transmit power threshold, the transmit power may be set to a fixed offset (e.g., 3 dB) below the maximum transmit power threshold. The offsets may be hard-coded or configured by a layer above the physical layer, such as layer 3 in LTE.

The same formulas described above can be used for DCI format 3/3A power control of PUSCH, assuming the same upper layer assigned bandwidth factors and MCS or, alternatively, using a last assigned bandwidth and MCS adjustment for future calculations.

The same formulas described above can be used for power control of PUCCH. In one embodiment, assuming the variations in PUCCH bandwidth and modulation are relatively limited in comparison to the PUSCH, the maximum and minimum power thresholds may simply be ignored.

The same formulas described above can be used for other power control related operations. In one embodiment, the reporting of power headroom can be based on a reference bandwidth and a reference MCS, where there is no PUSCH transmission.

It will be appreciated by those of skill in the art that, while portions of the foregoing discussion on power control address the use of dynamic, fixed or semi-persistent values (collectively reference values) of PUSCH bandwidth and MCS, the same concepts may be implemented using reference values based on the SRS count, at least because the number of sounding reference symbols is proportional to transmit bandwidth.

Figure 9:
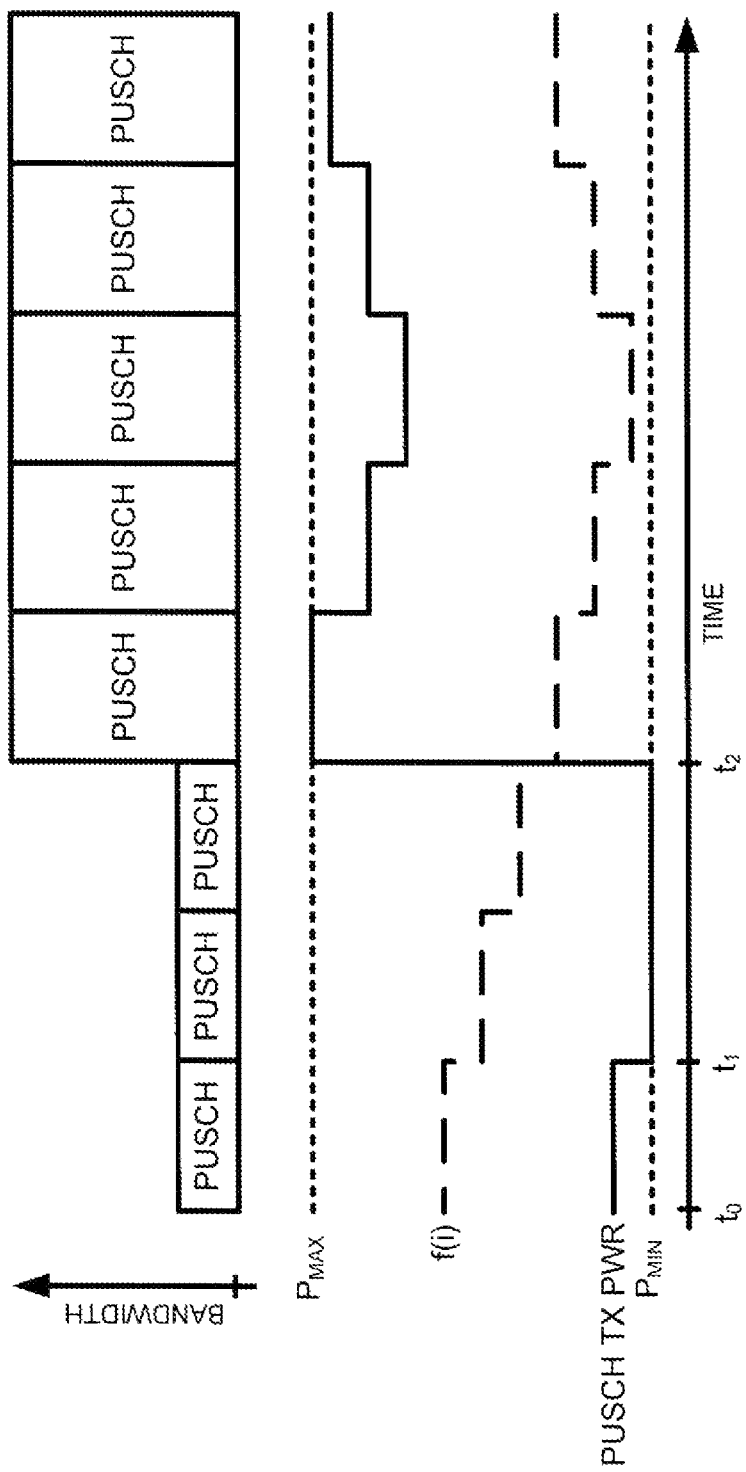
FIG. 9 is illustrates a power control method according to one embodiment.

FIG. 9 illustrates the effect of using fixed bandwidth and modulation parameters as described above. In FIG. 9, the PUSCH transmit power reaches the minimum power threshold ($P_{MIN}$) at $t_1$ as a result of decrements in the value of f(i). However, f(i) is not disabled because the calculated power (as opposed to the actual power) is still above the threshold due to the fixed minimum bandwidth parameter and modulation parameter, configured by the upper layer and used in the comparison formula. At time $t_2$, where the PUSCH bandwidth increases, the PUSCH transmit power can reach or exceed the maximum power threshold ($P_{MAX}$). However, f(i) is not disabled because the calculated power (as opposed to the actual power) is still below the threshold due to the fixed maximum bandwidth factor and modulation factor used in the comparison formula.

Figure 10:
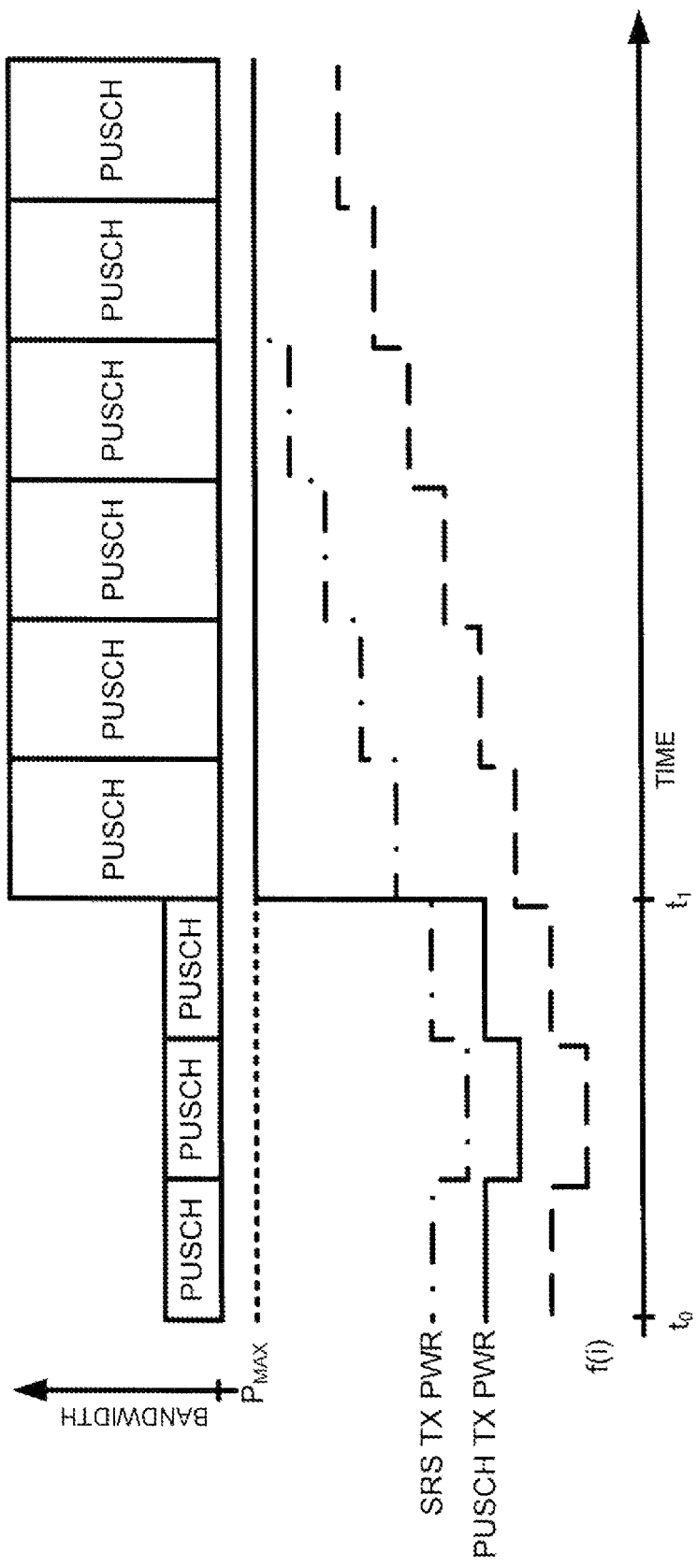
FIG. 10 illustrates a power control method according to one embodiment.

FIG. 10 illustrates the effect on SRS transmit power control using the same fixed bandwidth and modulation factors in the power control formulas as described above. In FIG. 10, the SRS transmit power tracks the PUSCH transmit power with a fixed offset until time $t_1$, where a bandwidth change in the PUSCH causes the PUSCH transmit power to reach or exceed the maximum power threshold ($P_{MAX}$) and temporarily increase the offset between the PUSCH transmit power and the SRS transmit power. However, f(i) is not disabled because the calculated power (as opposed to the actual power) is still below the threshold due to the fixed maximum bandwidth factor and modulation factor. As a result, f(i) increases are still effective to bring the SRS transmit power to a desirable level with respect to the PUSCH transmit power.

In one embodiment, another solution to the problems described above includes resetting the value of f(i) whenever the PUSCH transmit power reaches the maximum power threshold ($P_{MAX}$) or the minimum power threshold ($P_{MIN}$).

For example, if the PUSCH transmit power is at or above the maximum power threshold ($P_{MAX}$), the next power down command represented by a negative value of $\delta_{PUSCH}$ can reset the value of f(i) in the next subframe to:

$$f(i+1)=P_{CMAX}+\delta_{PUSCH}-10\log_{10}(M_{PUSCH}(i))+P_{o\_PUSCH}(j)+\alpha(j)\cdot PL+\Delta_{TF}(i) \quad (5)$$

Alternatively, the reset operation may be delayed until a predetermined number of power down commands have been received and the PUSCH transmit power is still at or above the maximum power threshold.

Similarly, if the PUSCH transmit power is at or below the minimum power threshold ($P_{MIN}$), the next power up command represented by a positive value of $\delta_{PUSCH}$ can reset the value of f(i) in the next subframe to:

$$f(i+1)=10\log_{10}(M_{PUSCH}(i))+P_{o\_PUSCH}(j)+\alpha(j)\cdot PL+\Delta_{TF}(i)-P_{CMIN}+\delta_{PUSCH} \quad (6)$$

Alternatively, the reset operation may be delayed until a predetermined number of power up commands have been received and the PUSCH transmit power is still at or below the minimum power threshold.

Figure 11:
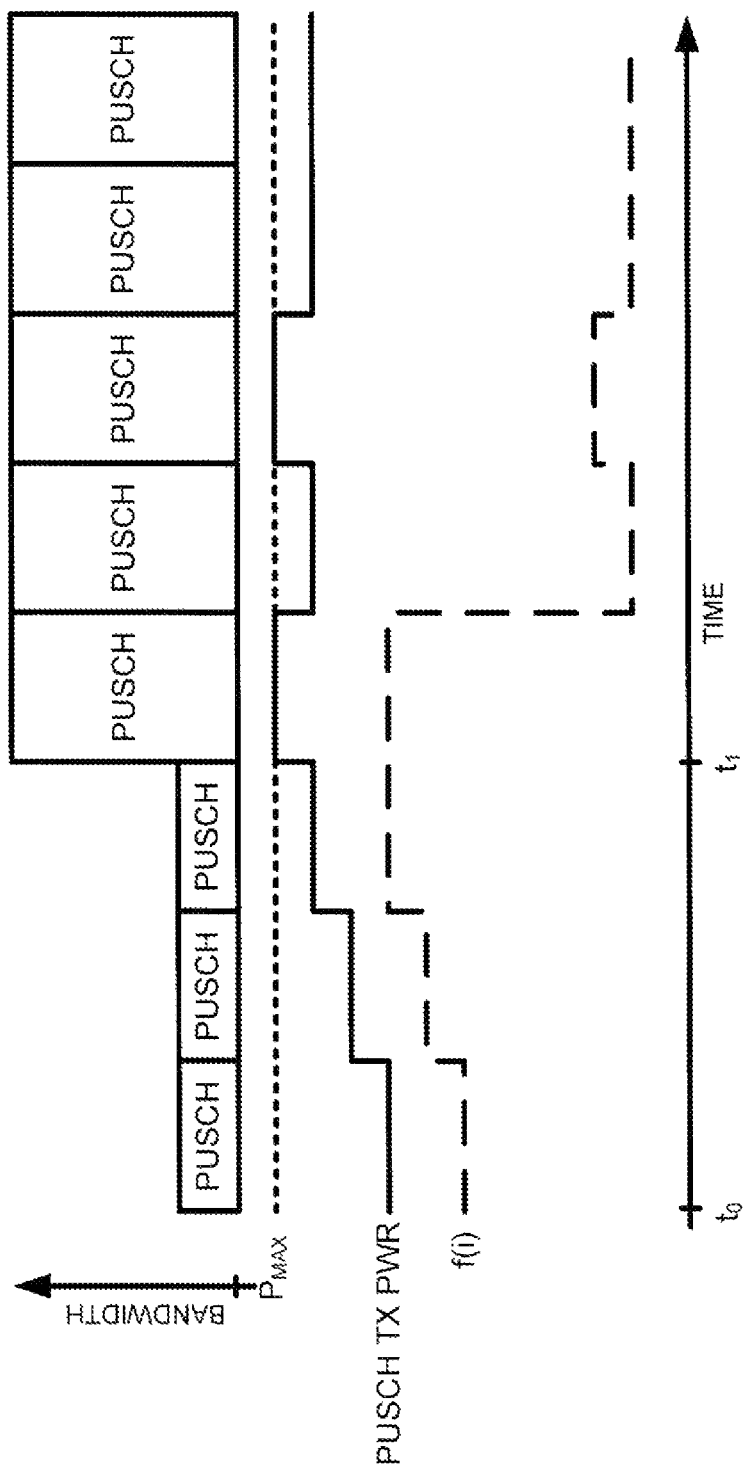
FIG. 11 illustrates a power control method according to one embodiment.

FIG. 11 illustrates the effect of resetting the value of f(i) in the exemplary case of a bandwidth increase that causes the PUSCH transmit power to reach or exceed the maximum power threshold ($P_{CMAX}$). As illustrated in FIG. 11, from time $t_0$ to time $t_1$, the PUSCH transmit power is below the maximum power threshold ($P_{CMAX}$) and tracks the changes in f(i). At time $t_1$, the allocated bandwidth of the PUSCH is increased (e.g., by DCI format 0 on the PDCCH), causing the total PUSCH transmit power to equal to or exceed the maximum power threshold ($P_{CMAX}$) and disabling additional power up commands. However, this condition triggers a reset of f(i) in the next subframe (or after a predetermined number of subframes containing power down commands) according to equation (5) above, dropping the total PUSCH transmit power below the maximum power threshold ($P_{CMAX}$) and re-enabling power up commands. While not illustrated separately, it will be appreciated by those of ordinary skill in the art that equation (6) can be similarly applied to a transition from a wide bandwidth to a narrow bandwidth that causes the total PUSCH transmit power to reach or drop below the minimum power threshold ($P_{CMIN}$) (either in the next subframe after the minimum power threshold is reached or crossed, or after a predetermined number of subframes containing power up commands).

In one embodiment, it is contemplated that the control loops associated with equations (1) and (2) can be eliminated and replaced with a method for adjusting the transmit power level where the UE, operating at a given transmit power level f(i) in subframe (1), receives a differential power command $\Delta P$ in the downlink and transmits at a power level f(i+1) in subframe (i+1), given by f(1+1)=f(i)+$\Delta P$.

In one contemplated embodiment, instead of the single control loop architecture described above, the UE may maintain a number of uplink transmit power control loops corresponding to an equal number of reference bandwidths or modulation and coding schemes. For example, a power control loop may be maintained for each possible bandwidth assignment. However, this approach may result in a large overhead, especially for systems with wide bandwidth capacity (e.g., 20 MHz supporting up to 100 RBs). Alternatively, the loops may be quantized. For example, a decimation of 10 would result in 10 loops for the exemplary 20 MHz system (e.g., one loop with a reference bandwidth of 5 RBs to cover any assigned bandwidth from 1-10 RBs, one loop with a reference bandwidth of 15 RBs to cover any assigned bandwidth from 11-20 RBs, etc.). The UE selects the control loop with a reference value closest to the value assigned in the downlink. Each control loop may be updated from subframe to subframe with a transmit power control (TPC) command received in a downlink control channel, but the actual transmit power is controlled by the selected loop. For example, if the PUSCH bandwidth assignment is 23 RBs, the UE would select the loop for 25 RBs.

It will be appreciated that the embodiments described above may also be applied to multi-carrier systems, such as those contemplated for LTE Advanced. For a multi-carrier system, a power control loop may be maintained by the UE for each carrier. There may be a UE-specific maximum transmit power $P_{UEMAX}$ and a carrier specific maximum transmit power $P_{CCMAX}$ associated with each control loop. The transmit power in subframe (i) may be controlled by a minimum selection function such as:

$$P_{PUSCH}(i)=\min[P_{UEMAX}, P_{CCMAX}, P_{PUSCH}(i-1)+f(i)]$$

Alternatively, the transmit power in subframe (i) may be controlled by a minimum selection function such as:

$$P_{PUSCH}(i)=\min[P_{UEMAX}/N, P_{CCMAX}, P_{PUSCH}(i-1)+f(i)],$$

where N is the number of carriers configured for the UE.

It will also be appreciated that the methods described above as separate embodiments may be employed as standalone solutions or in combination. Additionally, the value of f(i) used for PUSCH transmit power control may be decoupled from the value of f(i) used for SRS transmit power control. For example, the calculation of f(i) for PUSCH can conform to the LTE Rel-8 standard while the calculation of f(i) for SRS can use bandwidth parameters ($M_{PUSCH}$) and MCS parameters ($\Delta_{TF}$) that are configured by upper layer signaling, assigned on a semi-persistent basis or hard-coded, as described above. Additionally, the decoupling of PUSCH and SRS transmit power control can be conditional, occurring only when the PUSCH transmit power is at or above the maximum power threshold ($P_{MAX}$), or at or below the minimum power threshold ($P_{MIN}$).

Figure 12:
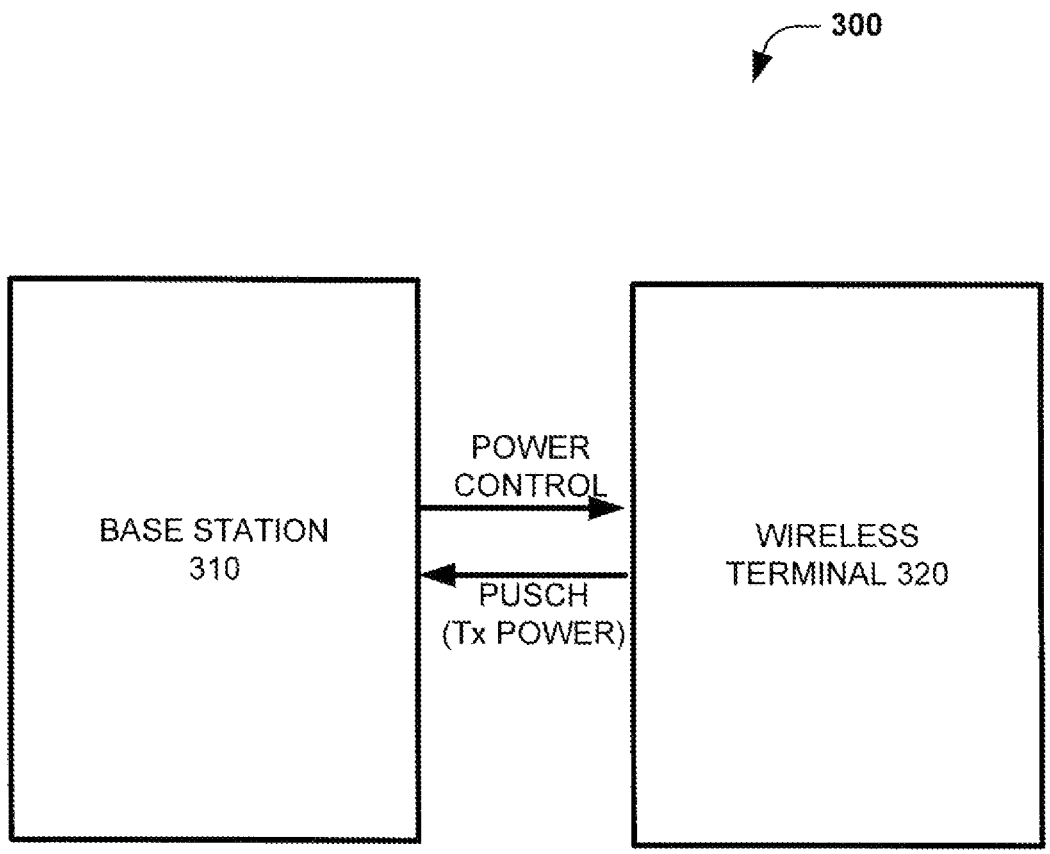
FIG. 12 illustrates a wireless communication system in one embodiment.

FIG. 12 is a block diagram of a system 300 in one embodiment. System 300 includes a base station 310 and a wireless terminal 320. Base station 310 is configured to receive path loss estimates from wireless terminal 320 and to transmit TPC (transmit power control) commands to the wireless terminal 320. Wireless terminal 320 is configured to transmit path loss estimates to the base station 310, to receive and process transmit power control commands received from the base station 310 and to transmit a physical uplink shared data channel to the base station after adjusting transmit power in response to the transmit power control command.

Figure 13:
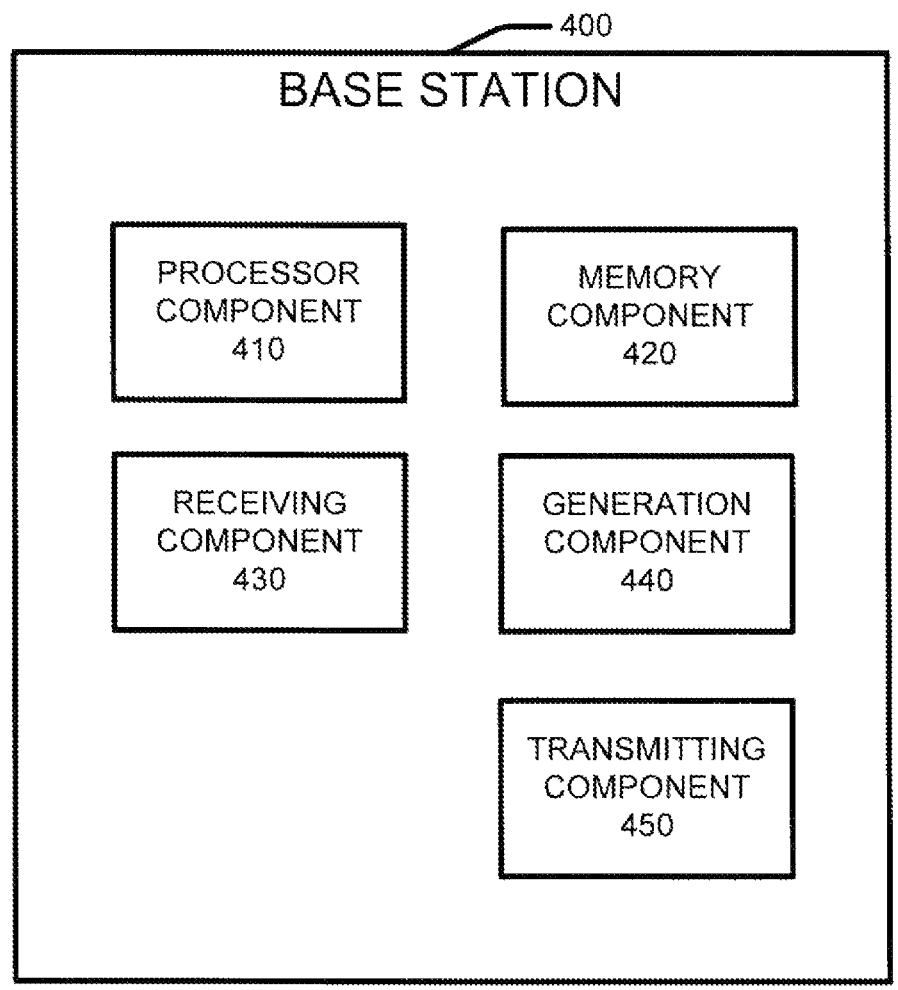
FIG. 13 illustrates a block diagram of a base station in one embodiment.

FIG. 13 illustrates a functional block diagram of a base station 400 in one embodiment. As illustrated in FIG. 13, base station 400 may include processor component 410, memory component 420, receiving component 430, generation component 440, and transmitting component 450.

In one aspect, processor component 410 is configured to execute computer-readable instructions related to performing any of a plurality of functions. Processor component 410 can be a single processor or a plurality of processors dedicated to analyzing information to be communicated from base station 400 and/or generating information that can be utilized by memory component 420, receiving component 430, generation component 440 and/or transmitting component 450. Additionally or alternatively, processor component 410 may be configured to control one or more components of base station 400.

In another aspect, memory component 420 is coupled to processor component 410 and configured to store computer-readable instructions executed by processor component 410. Memory component 420 may also be configured to store any of a plurality of other types of data including data generated/ received by any of receiving component 430, generation component 440, and/or transmitting component 450.

In yet another aspect, receiving component 430 and transmitting component 450 are also coupled to processor component 410 and configured to interface base station 400 with external entities. For instance, receiving component 430 may be configured to receive a signal from a wireless terminal, whereas transmitting component 450 may be configured to transmit a transmit power control command to the wireless terminal, where the transmit power control command directs the wireless terminal to adjust its transmit power.

As illustrated, base station 400 may further include generation component 440. Generation component 440 is configured to generate a transmit power control command based on the signal received from the wireless terminal, where the transmit power control command may include parameters based on resource allocation and/or transport format associated with a modulation and coding scheme (MCS).

Figure 14:
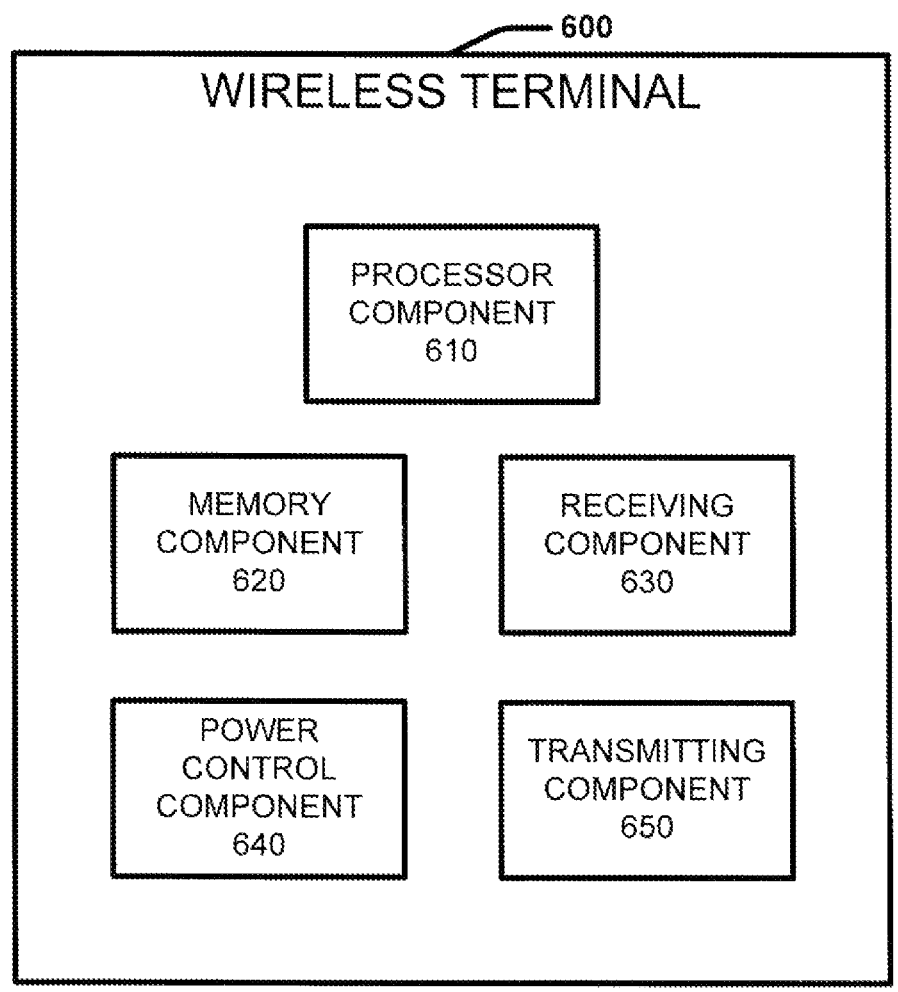
FIG. 14 illustrates a block diagram of a wireless terminal in one embodiment.

FIG. 14 illustrates a block diagram of a wireless terminal 600 according to one embodiment. As illustrated, wireless terminal 600 may include processor component 610, memory component 620, receiving component 630, power control component 640, and transmitting component 650.

Similar to processor component 410 in base station 400, processor component 610 is configured to execute computer-readable instructions related to performing any of a plurality of functions. Processor component 610 can be a single processor or a plurality of processors dedicated to analyzing information to be communicated from wireless terminal 600 and/or generating information that can be utilized by memory component 620, receiving component 630, power control component 640, and/or transmitting component 650. Additionally or alternatively, processor component 610 may be configured to control one or more components of wireless terminal 600.

In another aspect, memory component 620 is coupled to processor component 610 and configured to store computer-readable instructions executed by processor component 610. Memory component 620 may also be configured to store any of a plurality of other types of data including data generated/ received by any of receiving component 630, power control component 640, and/or transmitting component 650. Memory component 620 is analogous to memory component 420 in base station 400.

In yet another aspect, receiving component 630 and transmitting component 650 are also coupled to processor component 610 and configured to interface wireless terminal 600 with external entities. For instance, receiving component 630 may be configured to receive a transmit power control command from base station 400, where the transmit power control command directs the wireless terminal to adjust an uplink transmission power level based on, for example, at least one of a maximum transmit power or a minimum transmit power limit, resource allocation and transport formats including modulation and coding schemes. Transmitting component 650 may be configured to transmit a signal according to the adjusted transmit power.

As illustrated, wireless terminal 600 may further include power control component 640. In an aspect, power control component 640 is configured to ascertain a transmit power for wireless terminal 600 based on the transmit power control command.

Figure 15:
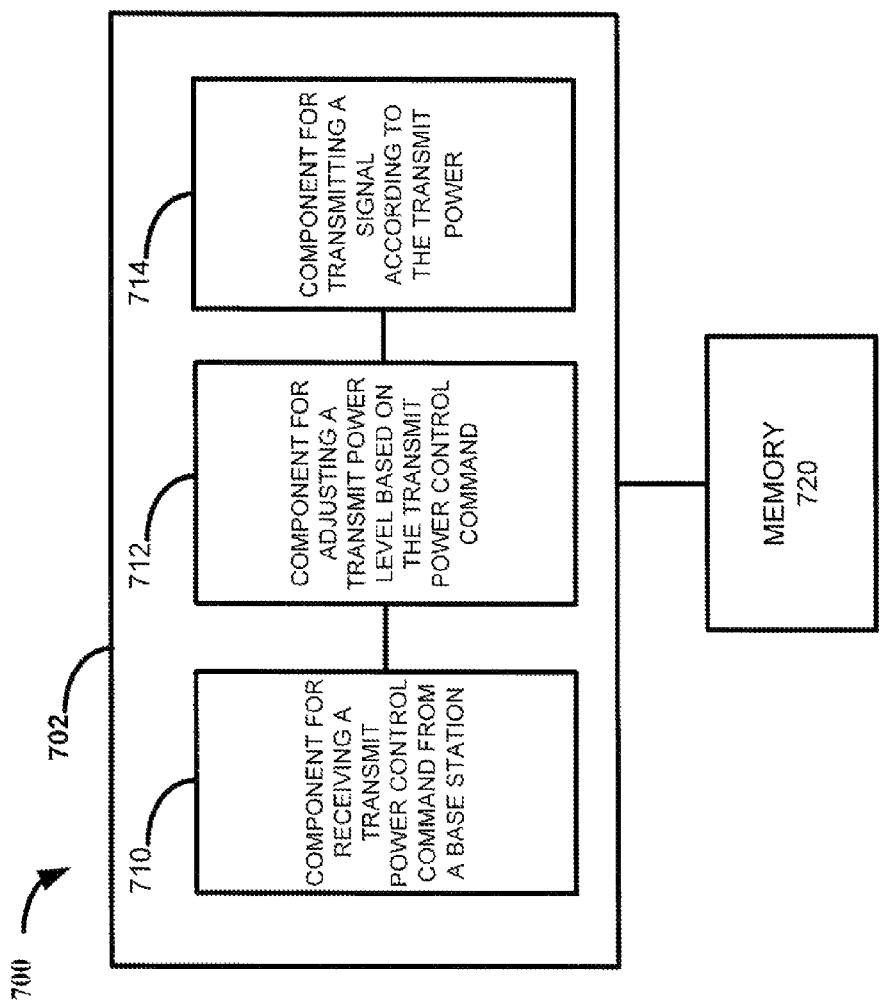
FIG. 15 illustrates a functional block diagram of a system in one embodiment.

FIG. 15 illustrates a block diagram of a system 700 according to one embodiment. System 700 and/or instructions for implementing system 700 can physically reside within a wireless terminal, for instance, where system 700 includes functional blocks that can represent functions implemented by, e.g., a processor software/firmware, etc. Moreover, system 700 includes a physical or logical group 702 of electrical components. As illustrated, group 702 can include a component 710 for receiving a transmit power control command from a base station, such as base station 400. Furthermore, group 702 can include a component 712 for adjusting a transmit power level based on the transmit power control command. Group 702 can also include a component 714 for transmitting a signal according to the transmit power. Additionally, system 700 can include a memory 720 that retains instructions for executing functions associated with components 710, 712, and 714. While shown as being external to memory 720, it is to be understood that components 710, 712, and 714 can exist within memory 720.

Figure 16:
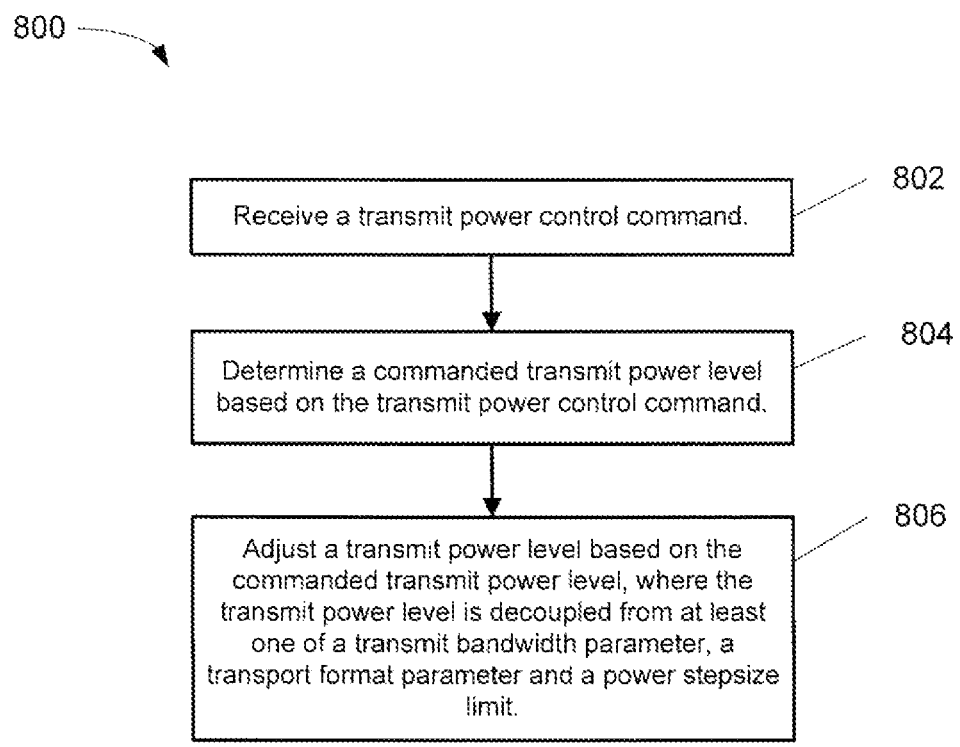
FIG. 16 is a flowchart illustrating a method according to one embodiment.

FIG. 16 is a flow chart illustrating a method 800 for accumulative power control in one embodiment. The method begins at operation 802, receiving a transmit power control command. The method continues at operation 804, determining a commanded transmit power level based on the transmit power control command. The method concludes at operation 806, adjusting a transmit power level based on the commanded transmit power level, where the transmit power level is decoupled from at least one of a transmit bandwidth parameter, a transport format parameter and a power stepsize limit.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the systems and apparatus described herein can be employed with a user equipment or mobile device, and can be, for instance, a module such as an SD card, a network card, a wireless network card, a computer (including laptops, desktops, personal digital assistants (PDAs), tablets), mobile phones, smart phones or any other suitable terminal that can be utilized to access a network. The user equipment accesses the network by way of an access component. In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. A memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable medium includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors one or more microprocessors in conjunction with a DSP core or any other suitable configuration. Additionally, at least one processor may comprise one or more modules operable to perform one or more of the steps and/or actions described herein.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short or long range wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
 receiving a transmit power control command;
 determining a commanded transmit power level based on the transmit power control command; and adjusting a transmit power level based on the commanded transmit power level, wherein the transmit power level is decoupled from at least one of a transmit bandwidth parameter, a transport format parameter, or a power step-size limit, wherein adjusting the transmit power level comprises at least one of:
  comparing the commanded transmit power level to a maximum transmit power threshold and selecting the minimum value between the commanded transmit power level and the maximum transmit power threshold, or
  comparing the commanded transmit power level to a minimum transmit power threshold and selecting the maximum value between the commanded transmit power level and the minimum transmit power threshold.

2. The method of claim 1, further comprising disabling a transmit power increment command if the commanded transmit power level is greater than or equal to the maximum transmit power threshold, when the minimum value between the commanded transmit power level and the maximum transmit power threshold is selected.

3. The method of claim 1, further comprising disabling a transmit power decrement command if the commanded transmit power level is less than or equal to the minimum transmit power threshold, when the maximum value between the commanded transmit power level and the minimum transmit power threshold is selected.

4. The method of claim 1, wherein the commanded transmit power level is based on a reference value of a sounding reference signal bandwidth.

5. The method of claim 1, further comprising reporting power headroom information based on a fixed or semi-persistent transport format parameter comprising a reference modulation and coding scheme.

6. A method, comprising:
receiving a transmit power control command;
determining a commanded transmit power level based on the transmit power control command; and
adjusting a transmit power level based on the commanded transmit power level, wherein the transmit power level is decoupled from at least one of a transmit bandwidth parameter, a transport format parameter, or a power step-size limit,
further comprising at least one of:
  replacing the transmit bandwidth parameter with a fixed or semi-persistent minimum bandwidth parameter,
  replacing the transmit bandwidth parameter with a fixed or semi-persistent maximum bandwidth parameter, or
  replacing the transport format parameter with a fixed or semi-persistent transport format parameter comprising a reference modulation and coding scheme.

7. A method, comprising:
receiving a transmit power control command;
determining a commanded transmit power level based on the transmit power control command; and
adjusting a transmit power level based on the commanded transmit power level, wherein the transmit power level is decoupled from at least one of a transmit bandwidth parameter, a transport format parameter, or a power step-size limit,
further comprising at least one of:
  using the transmit bandwidth parameter when the value of the commanded transmit power level is greater than the value of a minimum transmit power threshold and less than the value of a maximum transmit power threshold; and replacing the transmit bandwidth parameter with one of a fixed or semi-persistent transmit bandwidth parameter when the value of the commanded transmit power level is greater than or equal to the value of the maximum transmit power threshold or less than or equal to the value of the minimum transmit power threshold, or
  using the transmit format parameter when the value of the commanded transmit power level is greater than the value of a minimum transmit power threshold and less than the value of a maximum transmit power threshold; and replacing the transmit format parameter with one of a fixed or semi-persistent transmit format parameter when the value of the commanded transmit power level is greater than or equal to the value of the maximum transmit power threshold or less than or equal to the value of the minimum transmit power threshold.

8. A method, comprising:
receiving a transmit power control command;
determining a commanded transmit power level based on the transmit power control command; and
adjusting a transmit power level based on the commanded transmit power level, wherein the transmit power level is decoupled from at least one of a transmit bandwidth parameter, a transport format parameter, or a power step-size limit,
wherein adjusting the transmit power level comprises:
receiving a differential transmit power control command for an $n^{th}$ time interval; and
transmitting, in the $n^{th}$ time interval, at a power level corresponding to a sum of the differential power control command and a transmit power level used for an $(n-1)^{th}$ time interval.

9. A method, comprising:
receiving a transmit power control command;
determining a commanded transmit power level based on the transmit power control command; and
adjusting a transmit power level based on the commanded transmit power level, wherein the transmit power level is decoupled from at least one of a transmit bandwidth parameter, a transport format parameter, or a power step-size limit,
further comprising:
  using the transmit bandwidth parameter and the transmit format parameter to adjust the transmit power level when the value of the commanded transmit power level is greater than the value of a minimum transmit power threshold and less than the value of a maximum transmit power threshold;
  setting the transmit power level to a first offset above the minimum transmit power threshold when the value of the commanded transmit power level is less than or equal to the value of the minimum transmit power threshold; and
  setting the transmit power level to a second offset below the maximum transmit power threshold when the value of the commanded transmit power level is greater than or equal to the value of the maximum transmit power threshold.

10. A method, comprising:
receiving a transmit power control command;
determining a commanded transmit power level based on the transmit power control command; and
adjusting a transmit power level based on the commanded transmit power level, wherein the transmit power level is decoupled from at least one of a transmit bandwidth parameter, a transport format parameter, or a power stepsize limit, and decoupling the transmit power level from at least one of a minimum transmit power threshold and a maximum transmit power threshold, further comprising at least one of:

ignoring the power stepsize limit and resetting the transmit power level to a reference value if the value of the commanded transmit power level is greater than or equal to the value of the maximum transmit power threshold, ignoring the power stepsize limit and resetting the transmit power level to a reference value if the value of the commanded transmit power level is less than or equal to the value of the minimum transmit power threshold, resetting the transmit power level to a reference value if a predetermined number of power decrement commands have been received and the value of the commanded transmit power level is greater than or equal to the value of the maximum transmit power threshold, Or resetting the transmit power level to a reference value if a predetermined number of power increment commands have been received and the value of the commanded transmit power level is less than or equal to the value of the minimum transmit power threshold.

11. An apparatus, comprising:

means for receiving a transmit power control command;

means for determining a commanded transmit power level based on the transmit power control command; and means for adjusting a transmit power level based on the commanded transmit power level, wherein the transmit power level is decoupled from at least one of a transmit bandwidth parameter, a transport format parameter, or a power stepsize limit, wherein the means for adjusting the transmit power level comprises at least one of:

means for comparing the commanded transmit power level to a maximum transmit power threshold; and means for selecting the minimum value between the commanded transmit power level and the maximum transmit power threshold, or means for comparing the commanded transmit power level to a minimum transmit power threshold; and means for selecting the maximum value between the commanded transmit power level and the minimum transmit power threshold.

12. The apparatus of claim 11, further comprising means for disabling a transmit power increment command if the commanded transmit power level is greater than or equal to the maximum transmit power threshold, when the minimum value between the commanded transmit power level and the maximum transmit power threshold is selected.

13. The apparatus of claim 11, further comprising means for disabling a transmit power decrement command if the commanded transmit power level is less than or equal to the minimum transmit power threshold, when the maximum value between the commanded transmit power level and the minimum transmit power threshold is selected.

14. An apparatus, comprising:

means for receiving a transmit power control command;

means for determining a commanded transmit power level based on the transmit power control command; and means for adjusting a transmit power level based on the commanded transmit power level, wherein the transmit power level is decoupled from at least one of a transmit bandwidth parameter, a transport format parameter, or a power stepsize limit, further comprising at least one of:

means for replacing the transmit bandwidth parameter with a fixed or semi-persistent minimum bandwidth parameter, means for replacing the transmit bandwidth parameter with a fixed or semi-persistent maximum bandwidth parameter, or means for replacing the transport format parameter with a fixed or semi-persistent transport format parameter comprising a reference modulation and coding scheme.

15. An apparatus, comprising:

means for receiving a transmit power control command;

means for determining a commanded transmit power level based on the transmit power control command;

means for adjusting a transmit power level based on the commanded transmit power level, wherein the transmit power level is decoupled from at least one of a transmit bandwidth parameter, a transport format parameter, or a power stepsize limit; and means for decoupling the transmit power level from at least one of a minimum transmit power threshold and a maximum transmit power threshold, further comprising at least one of:

means for ignoring the power stepsize limit and resetting the transmit power level to a reference value if the value of the commanded transmit power level is greater than or equal to the value of the maximum transmit power threshold, means for ignoring the power stepsize limit and resetting the transmit power level to a reference value if the value of the commanded transmit power level is less than or equal to the value of the minimum transmit power threshold, means for resetting the transmit power level to a reference value if a predetermined number of power decrement commands have been received and the value of the commanded transmit power level is greater than or equal to the value of the maximum transmit power threshold, or means for resetting the transmit power level to a reference value if a predetermined number of power increment commands have been received and the value of the commanded transmit power level is less than or equal to the value of the minimum transmit power threshold.

16. An apparatus, comprising:

means for receiving a transmit power control command;

means for determining a commanded transmit power level based on the transmit power control command; and means for adjusting a transmit power level based on the commanded transmit power level, wherein the transmit power level is decoupled from at least one of a transmit bandwidth parameter, a transport format parameter, or a power stepsize limit, further comprising at least one of:

means for using the transmit bandwidth parameter when the value of the commanded transmit power level is greater than the value of a minimum transmit power threshold and less than the value of a maximum transmit power threshold; and means for replacing the transmit bandwidth parameter with one of a fixed or semi-persistent transmit bandwidth parameter when the value of the commanded transmit power level is greater than or equal to the value of the maximum transmit power threshold or less than or equal to the value of the minimum transmit power threshold, or means for using the transmit format parameter when the value of the commanded transmit power level is greater than the value of a minimum transmit power threshold and less than the value of a maximum transmit power threshold; and means for replacing the transmit format parameter with one of a fixed or semi-persistent transmit format parameter when the value of the commanded transmit power level is greater than or equal to the value of the maximum transmit power threshold or less than or equal to the value of the minimum transmit power threshold.

17. An apparatus, comprising:
means for receiving a transmit power control command;
means for determining a commanded transmit power level based on the transmit power control command; and
means for adjusting a transmit power level based on the commanded transmit power level, wherein the transmit power level is decoupled from at least one of a transmit bandwidth parameter, a transport format parameter, or a power stepsize limit,
wherein the means for adjusting the transmit power level comprises:
means for receiving a differential transmit power control command for an $n^{th}$ time interval; and
means for transmitting, in the $n^{th}$ time interval, at a power level corresponding to a sum of the differential power control command and a transmit power level used for an $(n-1)^{th}$ time interval.

18. An apparatus, comprising:
means for receiving a transmit power control command;
means for determining a commanded transmit power level based on the transmit power control command; and
means for adjusting a transmit power level based on the commanded transmit power level, wherein the transmit power level is decoupled from at least one of a transmit bandwidth parameter, a transport format parameter, or a power stepsize limit,
further comprising:
means for using the transmit bandwidth parameter and the transmit format parameter to adjust the transmit power level when the value of the commanded transmit power level is greater than the value of a minimum transmit power threshold and less than the value of a maximum transmit power threshold;
means for setting the transmit power level to a first offset above the minimum transmit power threshold when the value of the commanded transmit power level is less than or equal to the value of the minimum transmit power threshold; and
means for setting the transmit power level to a second offset below the maximum transmit power threshold when the value of the commanded transmit power level is greater than or equal to the value of the maximum transmit power threshold.

19. An article of manufacture, comprising a non-transitory machine-readable storage medium having instructions therein that, when read by a machine, cause the machine to:
receive a transmit power control command;
determine a commanded transmit power level based on the transmit power control command; and
adjust a transmit power level based on the commanded transmit power level, wherein the transmit power level is decoupled from at least one of a transmit bandwidth parameter, a transport format parameter, or a power stepsize limit,
further having instructions that cause the machine to replace at least one of:
the transmit bandwidth parameter with a fixed or semi-persistent minimum bandwidth parameter,
the transmit bandwidth parameter with a fixed or semi-persistent maximum bandwidth parameter, or
the transport format parameter with a fixed or semi-persistent transport format parameter comprising a reference modulation and coding scheme.

20. An article of manufacture, comprising a non-transitory machine-readable storage medium having instructions therein that, when read by a machine, cause the machine to:
receive a transmit power control command;
determine a commanded transmit power level based on the transmit power control command;
adjust a transmit power level based on the commanded transmit power level, wherein the transmit power level is decoupled from at least one of a transmit bandwidth parameter, a transport format parameter, or a power stepsize limit; and
decouple the transmit power level from at least one of a minimum transmit power threshold and a maximum transmit power threshold,
further having instructions that cause the machine to ignore at least one of:
the power stepsize limit and reset the transmit power level to a reference value if the value of the commanded transmit power level is greater than or equal to the value of the maximum transmit power threshold; or
the power stepsize limit and reset the transmit power level to a reference value if the value of the commanded transmit power level is less than or equal to the value of the minimum transmit power threshold.

21. An apparatus, comprising:
a processor; and
a memory comprising processor executable instructions that, when executed by the processor, configures the apparatus to:
receive a transmit power control command;
adjust a transmit power level based on the transmit power control command, wherein the transmit power level is decoupled from at least one of a transmit bandwidth parameter, a transport format parameter, or a power stepsize limit and decouple the transmit power level from at least one of a minimum transmit power threshold and a maximum transmit power threshold; and
ignore the power stepsize limit and reset the transmit power level to a reference value if the value of the commanded transmit power level is greater than or equal to the value of the maximum transmit power threshold.

22. An apparatus, comprising:
a processor; and
a memory comprising processor executable instructions that, when executed by the processor, configures the apparatus to:
receive a transmit power control command; and
adjust a transmit power level based on the transmit power control command, wherein the transmit power level is decoupled from at least one of a transmit bandwidth parameter, a transport format parameter, or a power stepsize limit, further comprising instructions that configure the apparatus to replace at least one of:
- the transmit bandwidth parameter with a fixed or semi-persistent minimum bandwidth parameter;
- the transmit bandwidth parameter with a fixed or semi-persistent maximum bandwidth parameter; or
- the transport format parameter with a fixed or semi-persistent transport format parameter comprising a reference modulation and coding scheme.

23. A method, comprising:

receiving a path loss estimate from a mobile device;

transmitting a transmit power control command to the mobile device, wherein the transmit power control command is decoupled from at least one of a transmit bandwidth parameter, a transport format parameter, or a power stepsize limit, and wherein the transmit power control command is configured to adjust a transmit power level of the mobile device; and one of replacing the transmit bandwidth parameter with a fixed or semi-persistent minimum bandwidth parameter or replacing the transmit bandwidth parameter with a fixed or semi-persistent maximum bandwidth parameter.

24. An apparatus, comprising:

means for receiving a path loss estimate from a mobile device;

means for transmitting a transmit power control command to the mobile device, wherein the transmit power control command is decoupled from at least one of a transmit bandwidth parameter, a transport format parameter, or a power stepsize limit, and wherein the transmit power control command is configured to adjust a transmit power level of the mobile device; and one of means for replacing the transmit bandwidth parameter with a fixed or semi-persistent minimum bandwidth parameter or means for replacing the transmit bandwidth parameter with a fixed or semi-persistent maximum bandwidth parameter.

25. An article of manufacture, comprising a non-transitory machine-readable storage medium having instructions therein that, when read by a machine, cause the machine to:

receive a path loss estimate from a mobile device;

transmit a transmit power control command to the mobile device, wherein the transmit power control command is decoupled from at least one of a transmit bandwidth bandwidth parameter, a transport format parameter, or a power stepsize limit, and wherein the transmit power control command is configured to adjust a transmit power level of the mobile device; and perform one of replacing the transmit bandwidth parameter with a fixed or semi-persistent minimum bandwidth parameter or replacing the transmit bandwidth parameter with a fixed or semi-persistent maximum bandwidth parameter.

26. An apparatus, comprising:

a processor; and a memory comprising processor executable instructions that, when executed by the processor, configures the apparatus to:

receive a path loss estimate from a mobile device; and transmit a transmit power control command to the mobile device, wherein the transmit power control command is decoupled from at least one of a transmit bandwidth bandwidth parameter, a transport format parameter, or a power stepsize limit, and wherein the transmit power control command is configured to adjust a transmit power level of the mobile device; and perform one of replacing the transmit bandwidth parameter with a fixed or semi-persistent minimum bandwidth parameter or replacing the transmit bandwidth parameter with a fixed or semi-persistent maximum bandwidth parameter.

* * * * *